United States Patent
Caccamesi et al.

[15] 3,675,468
[45] July 11, 1972

[54] LEAK TESTING APPARATUS AND METHOD

[72] Inventors: Vincent C. Caccamesi, Wilmington; Aaron C. Der Marderosian, Marlboro, both of Mass.

[73] Assignee: Raytheon Company, Lexington, Mass.

[22] Filed: Nov. 25, 1970

[21] Appl. No.: 92,624

[52] U.S. Cl. ............................................................73/40.7
[51] Int. Cl. .........................................................G01m 3/20
[58] Field of Search..............73/40, 40.7, 37, 49.2, 49.3, 73/52, 3

[56] References Cited

UNITED STATES PATENTS 3,403,544  10/1968  Francisco, Jr. ...............................73/3
3,455,143  7/1969  Shamp.........................................73/3

OTHER PUBLICATIONS

Publication: Radiflo Leak Detection, American Electronics, Inc., Rev. 10/16/57 pages 4 and 5 relied upon

*Primary Examiner*—Louis R. Prince
*Assistant Examiner*—William A. Henry, II
*Attorney*—Harold A. Murphy

[57] ABSTRACT

A method and apparatus for conditioning devices such as electronic components for fine and gross leak testing, the apparatus comprising means for introducing a fluid under pressure to the devices whereby the fluid will be forced into the interiors of leaky devices, and means for thereafter removing the fluid, while reclaiming same, whereupon the devices may be tested by conventional sniffing or weighing methods to determine those which leak.

6 Claims, 5 Drawing Figures

LEAK TESTING APPARATUS AND METHOD

BACKGROUND OF THE INVENTION

It is necessary in the manufacture of various types of electronic components such as encapsulated semiconductor devices, for example, to provide means for detecting which of the devices contain leaks. It is necessary in some cases to provide apparatus which is adequate and sensitive enough to locate devices having very minute leaks which may be smaller than about $5 \times 10^{-8}$ atm cc/sec., for example. In other cases apparatus is required for the purpose of locating devices which have gross leaks larger than $5 \times 10^{-6}$ atm cc/sec., for example.

Past attempts have been made which employed an insensitive method of inserting a liquid such as Freon TF into the devices. Subsequent tests often failed to detect the presence of the Freon TF for various reasons, and consequently the devices were later installed in systems that possibly would fail due to the entrapped liquid. Obviously, such liquid-filling methods were unsatisfactory for detecting leaks of minute sizes.

Such known processes involved separate hand-operated steps which relied almost entirely upon human acuity for the monitoring of the system such as proper pressure levels and determination of various problems which existed. These known processes required the expenditure of considerable man/hours for the operator to time the various steps of the separate valves, and to otherwise monitor the system to insure compliance with vacuum and pressure specifications. Obviously, such known leak testing methods resulted in high costs and inconsistent leak test results.

SUMMARY OF THE INVENTION

In accordance with the present invention there has been provided a novel apparatus which performs adequate, sensitive and repeatable fine and gross leak testing thereby imparting a high degree of confidence in the parts tested with the result that system failures have been substantially reduced where they were formally traceable to devices or components that were definitely undetected leakers. This is achieved by an automatically operable system which embodies two separate tanks, a parts tank and a storage tank, means for evacuating the parts tank, and means for forcing a fluid from the storage tank under pressure into the parts tank so that parts therein may be subjected to the pressurized fluid, whereupon parts which contain leaks will absorb or be filled by some of the fluid, and means for thereafter relatively quickly removing and reclaiming the fluid whereupon when the parts are removed from the parts tank and checked to determine the presence or absence of fluid therein an apparent distinction may be made between acceptable and unacceptable parts. Embodied in the apparatus are the necessary valves and gauges which enable efficient operation of the apparatus, as well as monitoring means to assure that the proper levels of vacuum and pressure are maintained for the prescribed periods of time.

In the case of fine leak detecting, the storage tank contains helium which will be directed into the parts tank during operation of the apparatus, and in the case of gross leak detection the storage tank contains a liquid such as a suitable fluorocarbon which will be urged out of the storage tank into the parts tank by means of a float against one side of which nitrogen gas is impelled under pressure.

The apparatus further includes efficient vacuum pumping means for evacuating the interior of the parts tank after the parts are inserted therein, and suitable electric controls for assuring the efficient time cycles concerned with the operation of the apparatus.

All of the above and other advantages are achieved by the herein described completely automatic system with the result that a considerable saving is produced by the requirement of many fewer man/hours in comparison with the man/hours required for the manual steps and manual monitoring previously required.

BRIEF DESCRIPTION OF THE DRAWINGS

The above and other objectives of this invention are achieved by the structures illustrated in the accompanying drawings, wherein.

DESCRIPTION OF THE PREFERRED EMBODIMENTS

Figure 1:
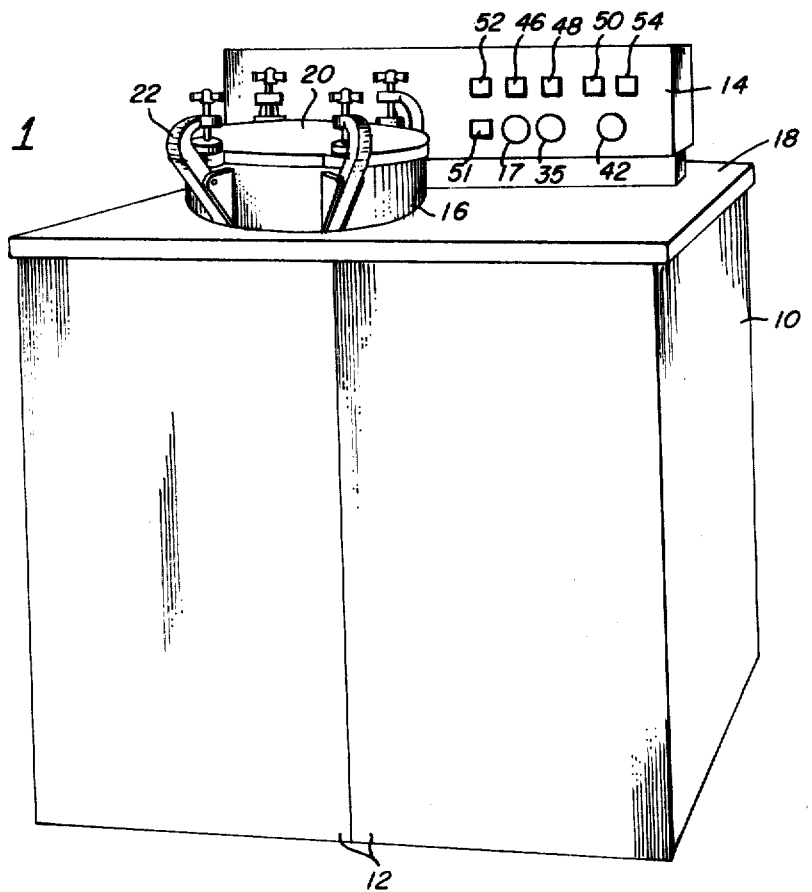
FIG. 1 is an isometric view of leak detecting apparatus embodying this invention.

Referring to the drawings, there is shown in FIG. 1 a cabinet 10 which houses the operational parts of the apparatus embodying the invention, which cabinet has doors 12 through which the major portion of the apparatus may be reached. There is provided a control panel or console 14 at the top rear of the cabinet 10 which contains the various controls such as push buttons which are to be manually operated and the various gauges which are to be described.

One of the major components of the apparatus is a parts tank 16 which is mounted within the cabinet 10 in such a manner that its upper end projects upwardly through an opening in the top 18 of the cabinet as shown in FIG. 1 so that it may be readily accessible for removal or insertion of parts to be tested. The tank 16 is provided with a removable top 20 which enables the operator to load and unload, and the top is secured in place by means such as a number of toggle clamps 22 so that the tank may be air- and liquid-tight.

The parts tank 16 is connected by a pipe 24 to a vacuum pump 26 which may be any suitable type such as, for example, the vacuum pump sold as Model D75 by Precision Scientific Co. The tank 16 is also connected by pipe 24 and pipes 26, 28, 30 and 32 to a fluid storage tank 34 which is adapted to contain a supply of the selected fluid to be utilized in the apparatus. In fine leak testing the fluid may be helium or any other selected inert gas, while for gross leak testing the fluid may be a suitable virtually inert liquid, preferably is suitable for production testing, which will not ionize with the voltages used in the system, and which will have a high dielectric strength, low surface tension, reasonable evaporation rate, and relatively high density. FC-75 fluorocarbon manufactured by 3M Company is a particularly suitable liquid for this purpose.

The storage tank 34 is connected by pipe 36 to a bottle 38 containing a desired pressure component. For example, bottle 38 in FIG. 2 may contain helium under pressure. A regulator valve 40 in pipe 36 controls the pressure of the gas which is allowed to escape from bottle 38. A manually controlled valve M1 in pipe 36 when closed prevents gas under pressure from being applied to the fluid in storage tank 34. On the console in a gauge 42 for visually indicating the pressure on the fluid in tank 34, the gauge 42 being located in an extension 37 of pipe 36.

Prior to the start of the operation of the system for fine leak testing, the parts to be tested are placed in tank 16 and the cover 20 is secured tightly by toggle clamps 22.

Figure 3:
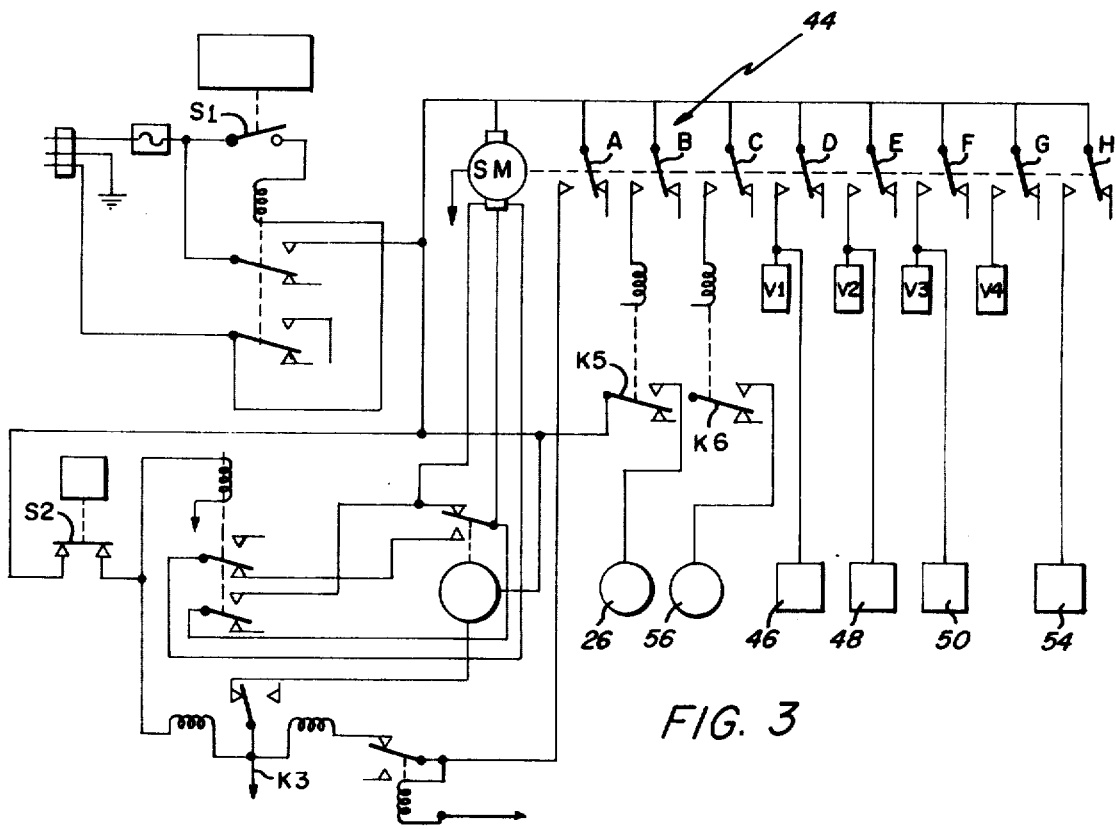
FIG. 3 is a schematic circuit utilized with the apparatus of FIG. 2.
Figure 5:
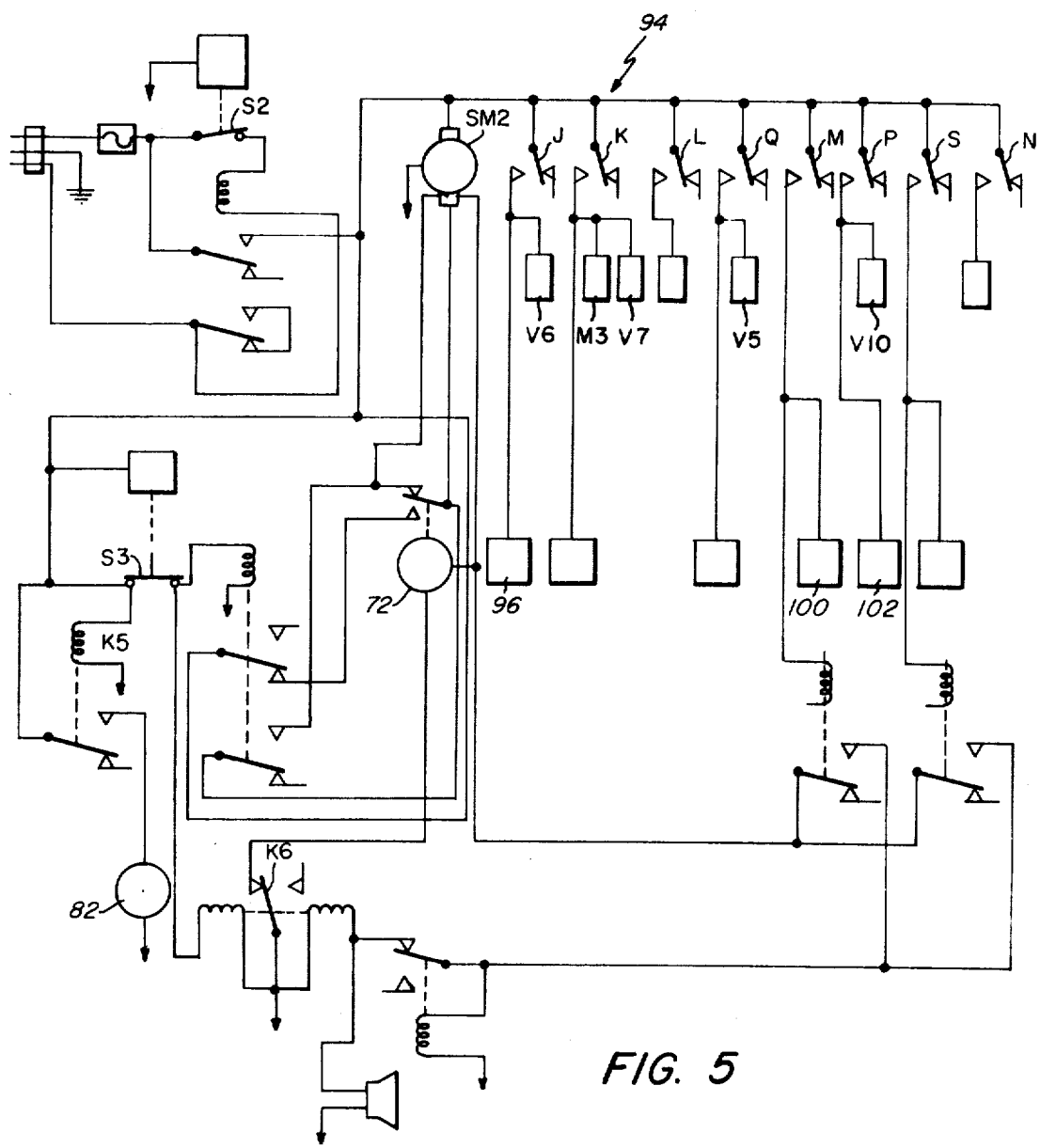
FIG. 5 is a schematic circuit utilized with the apparatus of FIG. 4.

As will be obvious from the circuit diagram in FIG. 3, the invention includes a progressive station programmer 44 similar to programmers used commonly on household appliances, including a step motor SM and a timer T. A power switch S1 is closed to electrically connect the apparatus to an external source of 115 volt energy. Valve M1 is opened and stays open during the entire sequence to be described and regulator valve 40 is set to the desired pressure setting such as 75 lbs., for example. This will allow gas to flow into the storage or reservoir tank 34. A valve V2 in pipe 30 is closed to prevent gas from flowing into the parts tank 16 at this time.

The automatic cycling of the apparatus is started by manual operation of the push button advance switch S2 which closes the circuit to a latching relay K3 by energization of one coil thereof. When coil A is energized, power is applied to the timer motor T which will sequence the drum programmer 44. The first step in the sequence is the closing of switch B to energize relay K5, and consequently start the operation of the vacuum pump 26, and the closing of switch D to open valve V1. Operation of vacuum pump 26 will evacuate the parts tank 16 and vacuumize the parts therein. This cycle will be indicated by the lighting of indicator 46 on the console and may be continued for a desired predetermined time cycle such as 11 minutes, for example. The vacuum pressure in tank 16 is indicated by a gauge 17 on the console 14.

At the end of the evacuation cycle, switches D and B open and switch E is closed. Opening of switches D and B causes deenergization of the vacuum pump 26 and turning off of the indicator 46. This also causes valve V1 to close. Closure of switch E opens valve V2 and turns on the parts pressure indicator light 48 on the console. At the same time, switch A closes to energize the second coil of latching relay K3. At this point helium flows from the storage tank 34 to the parts tank 16 and the pressure throughout the system becomes normalized at 75 lbs. by the regulator valve 40. Pressure in the parts tank 16 is indicated at the console 14 by gauge 35.

The time interval during which helium is applied under pressure to the parts in the tank may be varied depending upon the type of products being tested. For this reason, the apparatus is designed so that the automatic sequencing will be temporarily delayed until such a time as the operator desires to advance the sequence. The advance button S2 is again operated to close relay K3 and energize the motor SM and timer T. Then switch A opens. Switch E opens to close valve V2, switch F closes to open valve V3, and switch C closes to start the compressor pump 56 which pumps all the helium from the parts tank 16 back to the storage tank 34. Closing of switch F also lights the reclaim cycle indicator 50 on the console and opens valve V3. The compressor 56 is energized through relay K6 upon closing of switch C. This cycle takes approximately 5 minutes at the end of which time switch C is opened, causing the compressor to stop, and switch E is operated to close valve V2 and turn off indicator 50. At the same time switch G is closed to open valve V4 which is inserted in a pipe 52 which connects the parts tank 16 to external atmosphere. Opening of valve V4 allows air to enter the parts tank to equalize the pressure in this part of the system. This normally takes about 2 minutes. Then switch H closes to cause illumination of the parts ready indicator 54 on the console, and switch A is again closed to break the circuit to the timer T and the step motor SM by energization of the second coil of latching relay K3 and consequent opening thereof. At this point the sequence is completed and the apparatus is returned to its normal inoperative condition whereupon the cover of the parts tank 16 may be taken off and parts therein removed to be checked by a suitable gas sniffing method to determine which parts contain helium which was injected during the gas pressure cycle.

Figure 2:
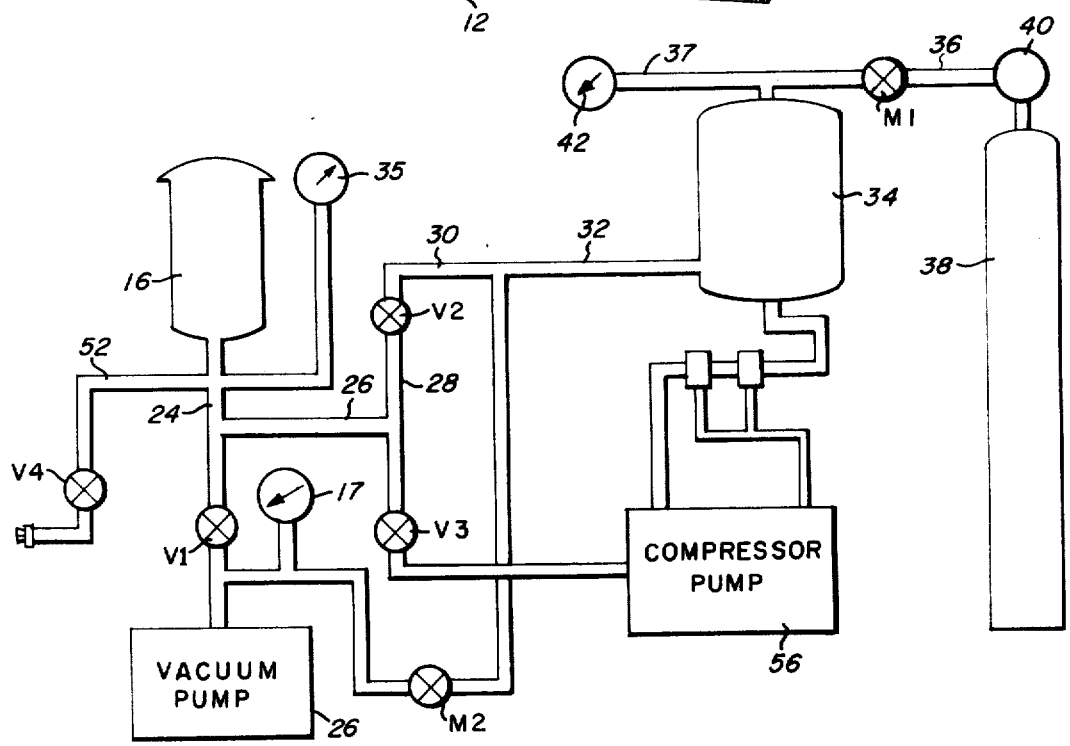
FIG. 2 is a schematic illustration of the apparatus embodying this invention.
Figure 4:
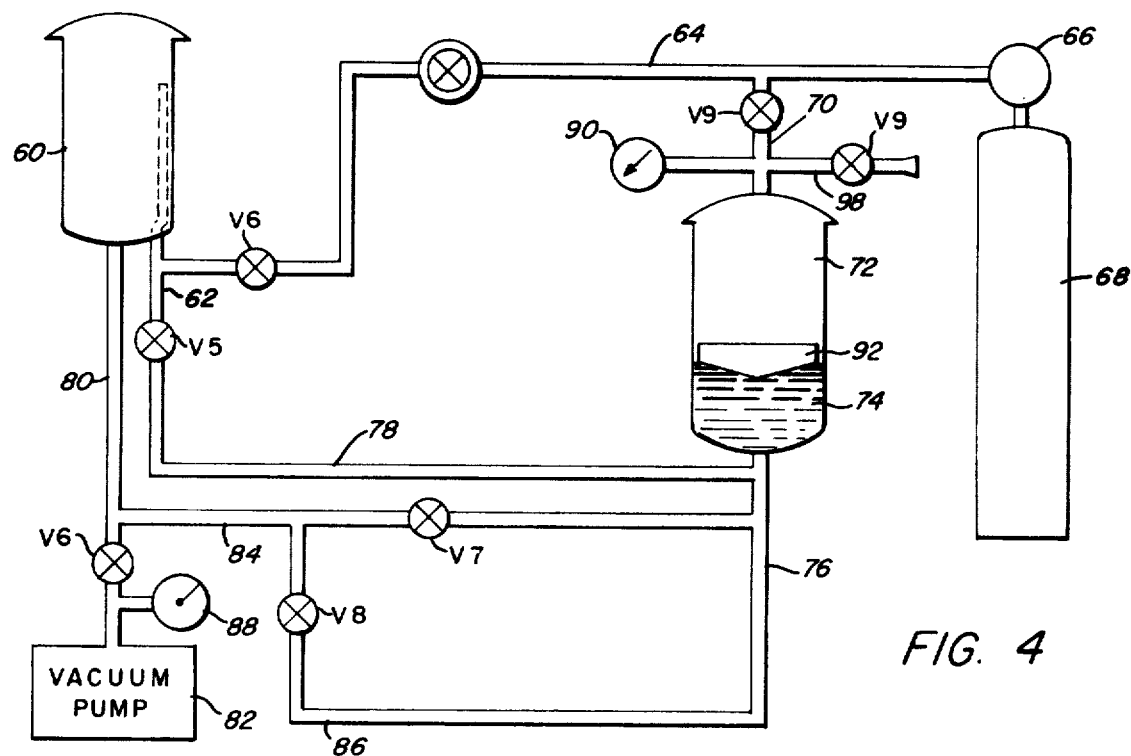
FIG. 4 is a schematic illustration of a modified apparatus in accordance with this invention.

It is to be understood, of course, that various filters, and other accessory components may be incorporated in the apparatus of FIG. 2 if desired.

The gross leak detecting apparatus illustrated in FIG. 3 is used for determining devices which have leaks of a size such as about $5 \times 10^{-6}$ atm cc/sec., for example, or larger. In this embodiment of the invention the parts tank 60 is connected through pipes 62 and 64 and regulator valve 66 to a bottle 68 containing a supply of gaseous nitrogen under pressure. Pipe 64 is connected by a pipe 70 to the upper end of a storage tank or reservoir 72 which contains a supply 74 of a suitable liquid such as a liquid fluorochemical. For example, FC-75 fluorocarbon sold by 3M Company is particularly desirable for the purpose, because it meets all the desired criteria for such liquids. For example, it is inert, is not ionizable with the apparatus voltages, and has a high dielectric strength, low surface tension, reasonable evaporation rate and relatively high density.

The lower end of tank 74 is connected by pipes 76 and 78 to pipe 62, which pipe 62 extends upwardly within parts tank 60 and terminates just below the upper end thereof as shown. Another pipe 80 connects the bottom of parts tank 60 with a vacuum pump 82, and pipe 80 is also connected through a pipe 84 with pipe 76, and additionally through bypass pipe 86 with pipe 76.

Vacuum pressure in parts tank 60 is indicated at the console by a gauge 88 while gas pressure in the storage reservoir 72 is indicated at the console by gauge 90.

Within the storage tank 72 and floating on liquid 74 is a float 92 which extends across the inner diameter of the tank and which rises and falls with changes in liquid level. Float 92 also serves as a barrier between the liquid 74 and the nitrogen which enters the tank from the pipe 70 and prevents the gas from dissolving in the liquid. The float is preferably a plastic disc of the required size and strength such that when gas enters the upper end of the reservoir it will force the float downwardly and thereby force liquid out through pipe 76.

In operation of this apparatus, the electrical circuit will be closed by manual closure of main power switch S2. Pump 82 starts when switch S2 is closed by energization of relay K5. The parts to be tested are placed in the parts tank 60 and the cover securely mounted in place. This embodiment also includes a progressive station programmer 94 including a step motor SM2 and a timer T2. Reservoir 72 contains a selected amount of liquid 74, and valve V9 in pipe 70 is closed, as are valves V5 and V6 in pipes 62 and 64 respectively.

The advance switch S3 is operated to start the drum programmer 94. This will automatically close the circuit to a latching relay K6 by energization of one coil thereof. This applies current to timer motor T2 which will sequence the programmer 94.

The first step in the sequence is the closing of switch J to open valve V6 in pipe 80. This pump will evacuate the parts tank 60 and vacuumize the parts therein. The cycle will be indicated by the lighting of indicator 96 on the console and may be continued for a desired predetermined time cycle such as 30 minutes, for example. The vacuum pressure in tank 60 is indicated by gauge 88.

At the end of the evacuation cycle switch J opens to cause valve V6 to close. Switch L closes and thereby opens valves V7 and V9. Opening of valve V9 allows gaseous nitrogen to enter the storage tank 72 and to urge float 92 down, thereby attempting to force liquid 74 out of the bottom of the tank into pipe 76. Opening of valve V7 allows the liquid to be forced from pipe 76 through pipes 84 and 80 into the parts tank 60. The fluid completely fills the previously evacuated parts tank 60 and hydraulically pressurizes the tank, using the pneumatic pressure from the nitrogen source 68 at the preset level, and this cycle may be continued for the desired time period such as 2 hours, for example.

After the pressure cycle is completed, switch L opens to close valves V9 and V7 and switch M operates to open valve V5. Also, switch N closes to open valve V6. This will allow liquid to partially drain down the tube or pipe 62 back to the storage tank 72. When this has occurred, the level of liquid in parts tank 60 will be below the upper end of the pipe 62. When this has taken place, switch R operates to stop the programmer and energize the "Ready for Test" indicator 100. At this time the cover may be taken off and the parts in tank 60 may be removed to be checked by a suitable weighing or sniffing method to determine which parts contain liquid and are, therefore, leaky.

After this the liquid in tank 60 is completely removed by closing advance switch S3 to again start the programmer. Then switch N operates to open valve V6 to allow helium to enter the parts tank at a selected relatively low pressure such as about 3 psig, for example. Switch P also operates to open valve V10 and to light the system drain indicator 102. Switch P further operates to open valve V8 in pipe 86. Therefore, this will force liquid back through pipes 80, 84, 86 and 76 back into the storage tank 72. This cycle may take about 6 minutes, for example.

During all draining of liquid from the parts tank 60 the valve V9 in pipe 98 is open via action of switch Q to provide a vent path for gaseous nitrogen that would otherwise be trapped in tank 72.

At the end of the sequence switch S is operated to break the circuit to the timer T2 and the step motor SM2 by energization of the second coil of the latching relay K6 and the consequent opening thereof. At this point the sequence is completed and the apparatus is returned to its normal inoperative condition whereupon the cover of the parts tank 60 may be taken off and other parts to be conditioned for leak testing may be placed in the tank. The apparatus then may be operated to repeat the foregoing cycles.

From the foregoing it will be apparent that all of the objectives of this invention have been achieved by the structure described in the foregoing wherein parts such as encapsulated electronic devices, for example, are preconditioned by the novel apparatus shown and described so that they may be subsequently tested so as to determine which of those devices are leaky and, therefore, defective. It will be apparent that modifications and changes may be made by those skilled in the art without departing from the spirit of the invention as expressed in the accompanying claims. Therefore, all matter shown and described is to be interpreted as illustrative and not in a limiting sense.

We claim:

1. Apparatus for automatically preconditioning devices for subsequent leak detection comprising:
    a parts tank in which said devices may be placed;
    a storage tank having a quantity of liquid therein and connected by piping to said parts tank;
    a source of pressurized gas connected by piping to said storage tank and to said parts tank;
    first means for evacuating said parts tank and any devices therein;
    second means for controllably introducing liquid under pressure into the parts tank from the storage tank whereby the liquid will enter any leaky devices in the parts tank;
    third means for reducing the pressure on the liquid in the parts tank;
    fourth means for returning a portion of the liquid in the parts tank to the storage tank; and
    fifth means for controllably introducing gas under pressure into the parts tank whereby the liquid remaining in the parts tank is returned to the storage tank.

2. Apparatus as set forth in claim 1 wherein said first means includes a vacuum pump and said fourth means includes piping connected to the storage tank and extending to a predetermined level within the parts tank and all of said means include automatically operable valves.

3. Apparatus as set forth in claim 2 and including an automatically operable progressive station programming means for sequentially operating said vacuum pump and said valves for evacuating the parts tank, filling the parts tank with liquid under pressure from the storage tank, reducing the pressure on the liquid in the parts tank after a predetermined interval of time, returning a portion of the liquid in the parts tank to the storage tank, and filling the parts tank with gas under pressure to drive the liquid remaining in the parts tank back toward the storage tank.

4. A method of preconditioning devices to be subsequently checked for leakage comprising the steps of placing the parts in a parts tank, sealing the tank and then automatically evacuating the tank, forcing liquid under pressure from a storage tank into the parts tank and into leaky devices therein, reducing pressure on the liquid in the parts tank, returning a portion of the liquid from the parts tank to the storage tank, removing the parts from the remaining portion of the liquid in the parts tank, and forcing gas under pressure into the parts tank to drive the remaining liquid therein back to the storage tank.

5. A method of preconditioning devices to be subsequently checked for leakage comprising the steps of placing the devices in a parts tank, sealing the tank, and then automatically evacuating the tank, filling the parts tank with liquid under pressure from a storage tank to force liquid into leaky devices in the parts tank, maintaining the devices under liquid pressure for a selected interval of time, then reducing the pressure on the liquid in the parts tank, returning a portion of the liquid in the parts tank to the storage tank while keeping the devices immersed in the liquid remaining in the parts tank, removing the devices from the parts tank, and filling the parts tank with gas under pressure to drive the remaining liquid in the parts tank back to the storage tank.

6. A method of preconditioning devices for subsequent leak testing comprising the steps of sealing the devices in a parts tank, and then utilizing an electrically connected progressive station programmer to operate automatically a vacuum pump and interconnected valves for evacuating the parts tank, supplying liquid under pressure from a storage tank to the parts tank and to the devices therein, and subsequently reducing the pressure on the liquid in the parts tank, returning a portion of the liquid in the parts tank to the storage tank, and after the devices have been removed from the parts tank supplying gas under pressure to the parts tank for driving the liquid remaining therein back to the storage tank.

* * * * *